J. W. BATSON.
Corn Harvester.
No. 15,408.
Patented July 29, 1856.
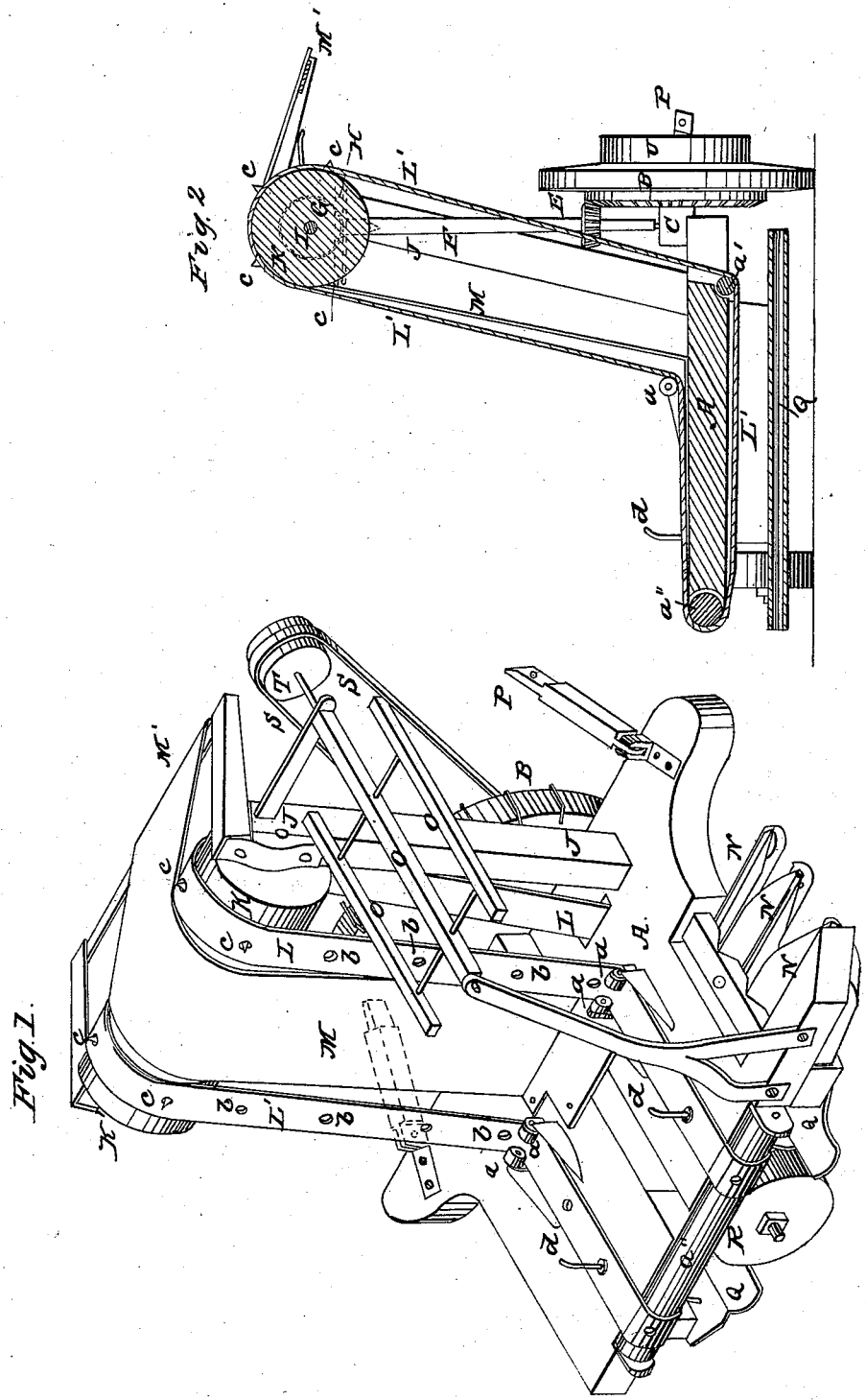

UNITED STATES PATENT OFFICE.

JOHN W. BATSON, OF TRIADELPHIA, MARYLAND, ASSIGNOR TO HIMSELF AND M. H. BATSON.

IMPROVEMENT IN THE RAKING APPARATUS OF CORN AND CANE HARVESTERS.

Specification forming part of Letters Patent No. 15,408, dated July 29, 1856.

*To all whom it may concern:*

Be it known that I, JOHN W. BATSON, of Triadelphia, in the county of Montgomery and State of Maryland, have invented certain new and useful Improvements in the Raking Apparatus of Corn and Cane Harvesters; and I do hereby declare the following to be a full, clear, and exact description of the same, reference being had to the accompanying drawings, making a part thereof, in which—

Figure 1 represents a perspective view of the machine entire, and Fig. 2 represents a vertical transverse section through the machine.

Similar letters, where they occur in both the figures, denote like parts in each.

To enable others skilled in the art to make and use my invention, I will proceed to describe the same with reference to the drawings.

A represents a platform, to which a main driving and supporting wheel, B, is affixed on an axle, C. This driving-wheel is furnished with a large cog-wheel, D, which takes into a small pinion, E, on a vertical shaft, F. The shaft F carries at its top a bevel cog-wheel, H, which turns another bevel cog-wheel, G, on a horizontal shaft, I, which is supported by proper bearings in the uprights J.

On the shaft I is arranged two pulleys, K K′, around which and over and around the friction-rolls $a$ $a'$ $a''$ pass two endless rake-belts, L L′, which have holes or openings $b$ $b$, &c., through them, into which studs $c$ $c$, &c., projecting from the pulleys K K′, take to give said belts a uniform motion without slipping.

Upon the rake-belts L L′ are arranged rake-teeth $d$ $d$, at such intervals as to take up the corn or cane from the platform when sufficient has accumulated to make a sheaf or bundle; or they may be so arranged as to be continually gathering.

Between the rake-belts L L′ is arranged a shield-piece, M, which extends up and over the pulleys K K′; but, instead of following the belts any farther than fairly over the pulleys, it projects outward and downward, as seen at M′, where it terminates.

The corn or cane, which is drawn against the cutters N by the reel O, and there severed, falls upon the endless belts L L′ and is caught by the rake-teeth $d$, (the rolls $a$ $a$ being so divided as to allow the rake-teeth to pass through, as seen in Fig. 1,) and carried across the platform and thence upward, the shield M serving to support it between the belts and to prevent them from sagging until it arrives at the top of the rolls or pulleys K K′, from which point the belts return downward, leaving the corn or cane on the shield. The shield from here inclines outward and downward, forming a sort of chute, down which the cut stalks descend and fall into a wagon driven alongside of the machine.

P P are shackle-bars by which the wagon may be united to the machine, so as to keep it in proper position to receive the stalks.

A plate, Q, may be arranged under the platform, between which and the bottom of the platform the rake-teeth pass, so as to protect said rake-teeth from the stubble underneath the machine.

R is a supporting-wheel at the opposite side of the platform from the wheel B.

The reel may be driven by an endless belt, S, passing over a pulley, T, on its shaft, and a pulley, U, attached to the drive-wheel B, and said drive-wheel may have its periphery roughened to prevent its tread from slipping.

Having thus fully described the nature of my invention, what I claim therein as new, and desire to secure by Letters Patent, is—

In combination with the endless rake-belts L L′, passing under and over the platform, and thence over the pulleys K K′, the shield M placed between them when said shield receives the corn or cane from the rakes at their highest elevation and conveys it into a wagon or other receptacle alongside, substantially as set forth.

JOHN W. BATSON.

Witnesses:
   A. B. STOUGHTON,
   E. COHEN.